US012535190B2

(12) United States Patent
Thomas et al.

(10) Patent No.: US 12,535,190 B2
(45) Date of Patent: Jan. 27, 2026

(54) SYSTEM AND METHOD FOR ELECTRIC HEATING TRACE SYSTEM MANAGEMENT

(71) Applicant: Chemelex Europe GmbH, Schaffhausen (CH)

(72) Inventors: Paul Thomas, Katy, TX (US); Dan Caouette, Katy, TX (US); William Collier, Cypress, TX (US)

(73) Assignee: Chemelex Europe GmbH, Schaffhausen (CH)

( * ) Notice: Subject to any disclaimer, the term of this patent is extended or adjusted under 35 U.S.C. 154(b) by 562 days.

(21) Appl. No.: 16/708,045

(22) Filed: Dec. 9, 2019

(65) Prior Publication Data

US 2020/0182412 A1 Jun. 11, 2020

Related U.S. Application Data

(60) Provisional application No. 62/776,902, filed on Dec. 7, 2018.

(51) Int. Cl.
*F17D 3/01* (2006.01)
*F17D 1/18* (2006.01)
(Continued)

(52) U.S. Cl.
CPC ............. *F17D 3/01* (2013.01); *F17D 1/18* (2013.01); *F17D 3/18* (2013.01); *G05B 15/02* (2013.01); *H05B 1/0244* (2013.01)

(58) Field of Classification Search
CPC ..... F17D 3/01; F17D 1/18; F17D 3/18; G05B 15/02; H05B 1/0244
See application file for complete search history.

(56) References Cited

U.S. PATENT DOCUMENTS

| | | | |
|---|---|---|---|
| 3,423,570 | A | 1/1969 | Trabilcy |
| 3,456,096 | A | 7/1969 | Bilbro |

(Continued)

FOREIGN PATENT DOCUMENTS

| | | |
|---|---|---|
| CN | 201594196 U | 1/2010 |
| CN | 107559529 A | 1/2018 |

(Continued)

OTHER PUBLICATIONS

B. Johnson et al., "Controlling pipe and equipment operating temperatures with trace heating systems," PCIC Europe 2013, pp. 1-10. (Year: 2013).*

*Primary Examiner* — Shelby A Turner
*Assistant Examiner* — Xiuqin Sun
(74) *Attorney, Agent, or Firm* — Quarles & Brady LLP (57) ABSTRACT

Embodiments of the invention provide an electric heat trace (EHT) control system for use with a piping system having pipes and capable of transporting a fluid. The EHT control system includes an EHT circuit for heating the piping system, a temperature sensor outputting a temperature value, a flow status sensor outputting a flow status value, and an EHT management system. The EHT management system can include a controller connected to the EHT circuit in order to selectively energize the EHT circuit. The controller can be connected to the temperature sensor in order to receive the temperature value and the flow status sensor in order to receive the flow status value. The controller can be configured to execute an EHT management program including the steps of receiving the temperature value, receiving the flow status value, and utilizing the temperature value and/or the flow status value to determine whether or not to energize the EHT circuit.

20 Claims, 9 Drawing Sheets

(51) Int. Cl.
  *F17D 3/18* (2006.01)
  *G05B 15/02* (2006.01)
  *H05B 1/02* (2006.01)

(56) References Cited

U.S. PATENT DOCUMENTS

| | | | |
|---|---|---|---|
| 4,002,881 A | 1/1977 | West | |
| 4,083,243 A | 4/1978 | Cochran, Jr. | |
| 4,336,708 A | 6/1982 | Hobgood et al. | |
| 4,484,471 A | 11/1984 | Swithenbank et al. | |
| 4,859,834 A | 8/1989 | Hausler et al. | |
| 5,064,604 A | 11/1991 | Barton | |
| 5,694,963 A * | 12/1997 | Fredell | E03B 7/12 |
| | | | 137/557 |
| 6,005,228 A | 12/1999 | Dickens et al. | |
| 6,202,656 B1 | 3/2001 | Schmitt | |
| 6,498,898 B2 | 12/2002 | Schmitt | |
| 6,564,011 B1 | 5/2003 | Janoff et al. | |
| 6,894,254 B2 | 5/2005 | Hauschulz | |
| 7,260,320 B2 | 8/2007 | Stanzel et al. | |
| 7,449,661 B1 | 11/2008 | Bench | |
| 7,679,033 B2 | 3/2010 | Westfield et al. | |
| 8,360,635 B2 | 1/2013 | Huang et al. | |
| 8,541,716 B2 | 9/2013 | Gu et al. | |
| 9,891,181 B2 | 2/2018 | Pennington et al. | |
| 10,634,284 B2 * | 4/2020 | Chakkalakal | F17D 3/01 |
| 2009/0129763 A1 | 5/2009 | Cabrera | |
| 2010/0084393 A1 | 4/2010 | Nolte | |
| 2012/0057857 A1 | 3/2012 | Kenney et al. | |
| 2016/0138749 A1 | 5/2016 | Geertsen et al. | |
| 2016/0245447 A1 * | 8/2016 | Crombie | H05B 1/0244 |
| 2019/0307084 A1 * | 10/2019 | Ersavas | A01G 25/023 |
| 2019/0360739 A1 * | 11/2019 | Brown | E01D 19/16 |

FOREIGN PATENT DOCUMENTS

| | | |
|---|---|---|
| CN | 208107354 U | 11/2018 |
| JP | 2006250390 A * | 9/2006 |
| WO | 2012152986 A1 | 11/2012 |
| WO | 2016133641 A1 | 8/2016 |

* cited by examiner

SYSTEM AND METHOD FOR ELECTRIC HEATING TRACE SYSTEM MANAGEMENT

CROSS-REFERENCE TO RELATED APPLICATIONS

This application is based on, claims priority to, and incorporates herein by reference in its entirety, U.S. Provisional Application Ser. No. 62/776,902, filed Dec. 7, 2018, and entitled "Devices and Methods For Electric Heating Trace System Management."

BACKGROUND

Piping systems are often used to transport a liquid and/or gas product, such as a petroleum product, over large distances, such as from an extraction point to a processing facility. If the extraction location and/or the processing facility are located in a cold weather environment, it may be necessary to provide a heating element, or heat trace, to maintain the pipe at a desired temperature to prevent the fluid product from freezing, or in temperature sensitive operations, to maintain a temperature that allows for an efficient flow of the fluid product. The heating element along with any associated components can be known as an electric heating trace (EHT) circuit.

Currently, typical EHT circuits are either energized or not energized based on the temperature of the piping or the temperature of the surrounding ambient. When the EHT circuit is energized, the fluid in the pipe can be kept at a temperature above a temperature setpoint. The temperature setpoint can be a temperature that keeps the fluid relatively liquid enough to support fluid flow. If the EHT circuit is left unenergized for too long, a cooler temperature may result in the transported fluid freezing, becoming more viscous and/or the fluid not being able to flow properly. The increased viscosity or phase change may cause an unwanted pressure buildup in the piping system.

While leaving the EHT circuit energized constantly can keep the fluid in the pipe above the temperature setpoint, this method has drawbacks. For example, the EHT circuit can draw more energy than is required to keep the fluid above the temperature setpoint. Additionally, if the fluid in the pipe is flowing, the fluid may not require any heating from the EHT circuit in order to continue flowing. When the EHT circuit is unnecessarily energized, the EHT circuit can waste energy, as well as cause undue wear to the EHT circuit and associated equipment.

SUMMARY

Embodiments of the invention provide EHT control systems and methods for efficiently and cost-effectively managing an EHT circuit while overcoming the above-mentioned drawbacks of previous systems. According to one embodiment of the invention, an electric heat trace (EHT) control system includes an EHT circuit for heating a piping system, a temperature sensor outputting a temperature value, a flow status sensor outputting a flow status value, and an EHT management system. The EHT management system can include a controller connected to the EHT circuit in order to selectively energize the EHT circuit. The controller can be connected to the temperature sensor in order to receive the temperature value and the flow status sensor in order to receive the flow status value. The controller can be configured to execute an EHT management program including the steps of receiving the temperature value, receiving the flow status value, and utilizing the temperature value and/or the flow status value to determine whether or not to energize the EHT circuit.

DETAILED DESCRIPTION

Figure 1:
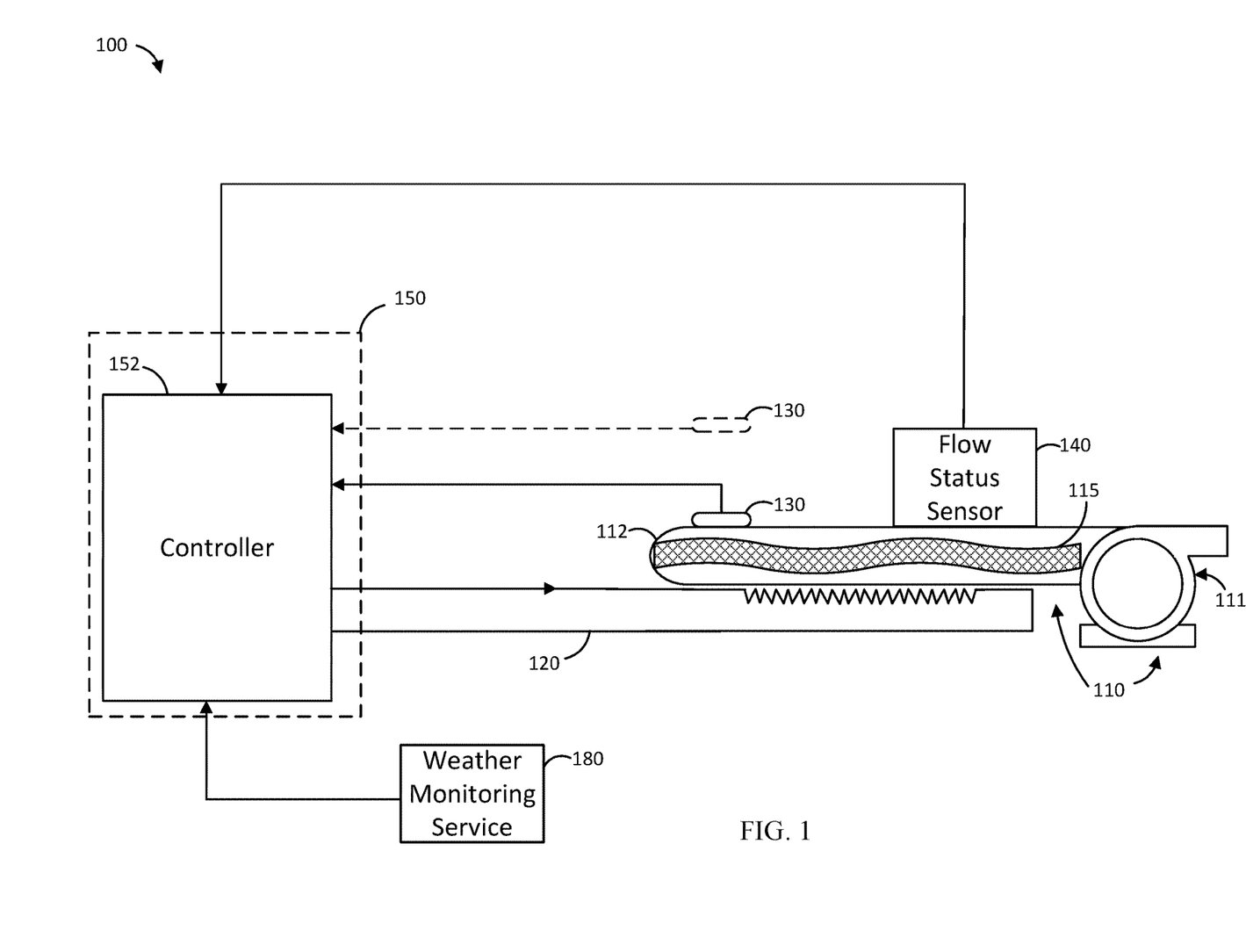
FIG. 1 is a schematic diagram of an electric heat trace (EHT) control system according to some embodiments of the invention.
Figure 2:
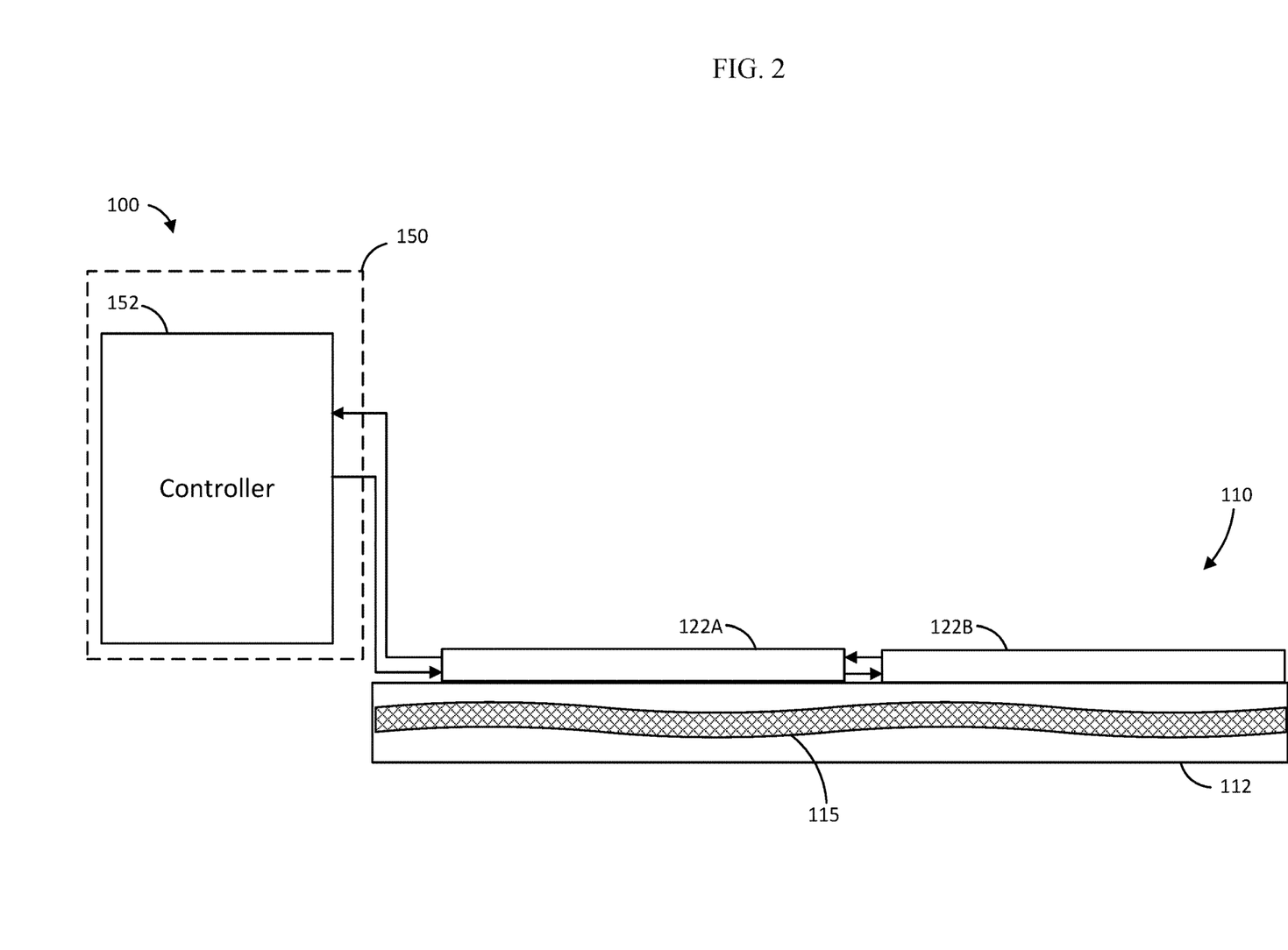
FIG. 2 is a schematic diagram of heat trace cables included in the EHT control system of FIG. 1.
Figure 3:
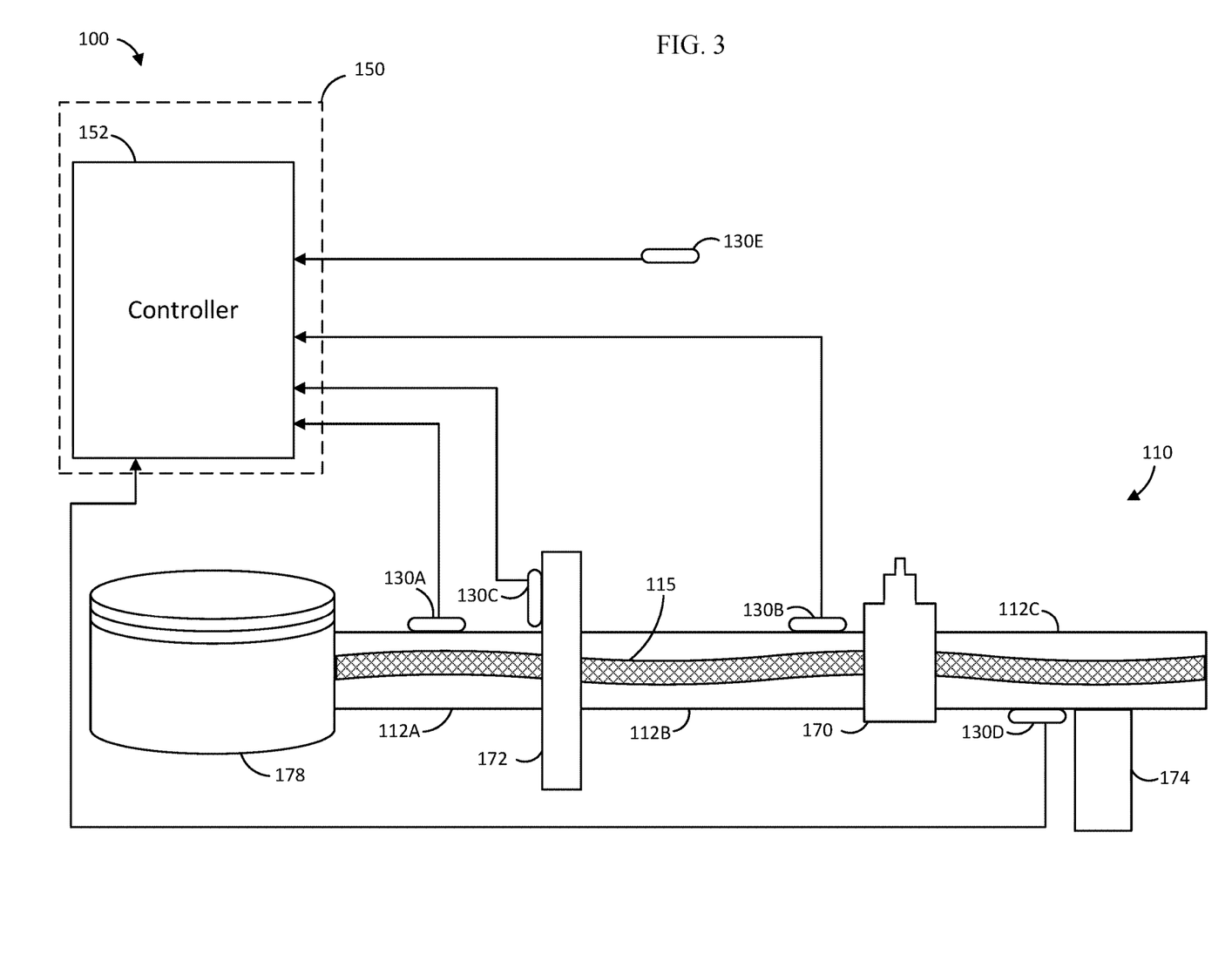
FIG. 3 is a schematic diagram of temperature sensors included in the EHT control system of FIG. 1.

FIGS. 1-3 illustrate an electric heat trace (EHT) control system 100 according to one embodiment of the invention. The EHT control system 100 can be used with a piping system 110 that can also be referred to as a "fluid transport system." The EHT control system 100 can also include an EHT heating element 120, a temperature sensor 130, a flow status sensor 140, and an EHT management system 150.

The piping system 110 can include pipes 112 and a pump 111. The piping system 110 can transport a fluid 115 such as petroleum, water, or any other substance that may become more viscous at an ambient temperature. The pump 111 can include a pump motor (not shown). The pump 111 can be used to pump the fluid 115 throughout the pipes 112. Some applications may not require the pump 111 for fluid flow, such as gravity-fed applications where the fluid 115 flows downward. The pipes 112 can be included in a larger piping network. The piping system 110 can also include devices other than pipes that are capable of storing and/or transporting fluids such as tanks and/or storage vessels. The piping system 110 can include fittings such as adaptors, elbows, couplings, unions, nipples, reducers, tees, crosses, end caps, electrical or mechanical valves, flanges, and/or other devices interconnected with pipes, tanks, storage vessels, etc. The piping system 110 can include support structures such as pipe anchors and/or pipe guides configured to hold the pipes 112 in place and/or prevent rotation of the pipes 112. As will be discussed further below, certain elements of the piping system 110 such as valves, flanges, pipe anchors, and/or pipe guides can be major sources of heat loss in the piping system.

The EHT heating element 120, which is also referred to as an EHT heating circuit, can heat the piping system 110. More specifically, the EHT heating element 120 can heat the pipes 112 in order to transfer heat to the fluid 115. Referring to FIG. 2 in particular, the EHT heating element 120 can include one or more heat trace cables 122. The heat trace cables 122, such as heat trace cables 122A and 122B, can be coupled together, in series and/or parallel, so that all of the heat trace cables 122 are energized or not energized in unison.

As shown in FIG. 1, the temperature sensor 130 can be placed on an exterior of one of the pipes 112 and coupled to the EHT management system 150, which includes a controller 152. The temperature sensor 130 may be wirelessly connected (e.g., using WiFi or Zigbee) to a controller 152 or coupled to the controller 152 using a wired connection (e.g., a three wire connection). In some embodiments, a network of wireless sensors may communicate with the controller 152 using a mesh communication protocol. The temperature sensor 130 can be a resistance thermometer, resistance temperature detector, or other applicable sensor capable of detecting a temperature. The temperature sensor 130 can output a temperature value. The temperature value can be an approximation of the temperature of one or more of the pipes 112. As will be described below in conjunction with FIG. 7, in some embodiments, the temperature sensor 130 can be a linear temperature sensor, such as a distributed temperature sensing (DTS) system. The DTS system can include an optical fiber configured to sense temperature at a plurality of data points along the length of the optical fiber. The optical fiber can be arranged throughout the piping system 110. More specifically, the optical fiber can be arranged on the outer surface of the pipes 112. In some embodiments, the optical fiber can be arranged inside the pipes 112. In these embodiments, the temperature sensor may include a stand-alone signal controller configured to provide a laser source to the optical fiber and to process signals from the optical fiber in order to determine multiple temperature values at various locations along the optical fiber. Alternatively, the controller 152 can provide the functionality of the signal controller.

In some embodiments, the temperature sensor 130 can be positioned near the piping system 110 but not on the exterior of one of the pipes 112 in order to measure ambient air temperature. The temperature sensor 130 can be positioned so that the temperature sensed by the temperature sensor correlates to the ambient temperature near the piping system 110. The temperature sensor 130 can alternatively be a remote sensor located within the geographical area (e.g., a zip code) of the piping system 110. The remote sensor can be monitored by a weather monitoring service such as AccuWeather™. In some embodiments, multiple temperature sensors can be used to monitor multiple temperatures at different locations in the piping system 110 and/or near the piping system 110.

As shown in FIGS. 1 and 3, the EHT control system 100 can include multiple temperature sensors arranged at different locations. Elements such as the flow status sensor 140 are not shown for simplicity. As shown in FIG. 3, the controller 152 can be coupled to a first temperature sensor 130A placed on the exterior of a first pipe 112A included in the piping system 110. The controller 152 can be coupled to a second temperature sensor 130B placed on the exterior of a second pipe 112B included in the piping system 110. The first temperature sensor 130A can output a temperature value associated with a temperature of the first pipe 112A, and the second temperature sensor 130B can output a temperature value associated with a temperature of the second pipe 112B.

The fluid 115 may be a different temperature at different locations within the piping system 110. More specifically, the temperature of the fluid 115 may be lower at locations near elements of the piping system 110 that are prone to lose heat more quickly than the pipes 112A-C. As mentioned above, valves, flanges, pipe anchors, and/or pipe guides may be more susceptible to heat loss. The valves, flanges, pipe anchors, and/or pipe guides may be referred to as "high heat loss points." Accordingly, it may be desirable to place at least one temperature sensor on a pipe near a high heat loss point and/or on the high heat loss point, because the fluid 115 may be more prone to freezing or dropping below a temperature setpoint at the high heat loss points, as compared to the first pipe 112A and/or the second pipe 112B.

For example, the second temperature sensor 130B can be placed on the second pipe 130B near a valve 170 coupled to the second pipe 112B and the third pipe 112C. As another example, a third temperature sensor 130C can be placed on a flange 172 coupled to the first pipe 112A and the second pipe 112B and output a temperature value associated with the temperature of the flange 172. As yet another example, a fourth temperature sensor 130D can be placed on a third pipe 112C near a pipe anchor 174 coupled to the third pipe 112 and configured to hold the third pipe 112C in place. The fourth temperature sensor 130D can output a temperature value associated with a temperature of the third pipe 112C near the pipe anchor 174. The valve 170 and the flange 172 each have more surface area per unit length than the first pipe 112A and the second pipe 112B, and thus can radiate more heat than the first pipe 112A and the second pipe 112B. The pipe anchor 174 can conduct heat away from the third pipe 112C and potentially reduce the temperature of the fluid 115. Still further, a fifth temperature sensor 130E can be arranged near the piping system 110 in order to measure ambient air temperature. The first pipe 112A can be further coupled to a fluid collection device such as a holding tank 178.

The EHT management system 150 can use the temperature values provided by multiple temperature sensors (i.e., the first temperature sensor 130A, the second temperature sensor 130B, the third temperature sensor 130C, the fourth temperature sensor 130D, and the fifth temperature sensor 130E) to prevent the fluid from freezing or keep the fluid 115 above a temperature setpoint.

As shown in FIG. 1, the flow status sensor 140 can provide information related to a flow of the fluid 115 to the controller 152. The flow status sensor 140 can be a flow meter or another suitable device that can measure one or more parameters related to the flow of the fluid 115, such as flow rate. The flow status sensor 140 can also be an electrical current meter, speed gauge, motor controller, or another device that can measure one or more parameters related to the operation of the pump 111 and/or pump motor. The flow status sensor 140 can be a sensor that receives a signal indicating whether the pump 111 and/or pump motor is on or off. For example, a current meter coupled to the pump motor of the pump 111 could be used to determine if the pump 111 is drawing power and is therefore running, which can indicate flow of the fluid 115. Additionally, a motor controller coupled to the pump motor could be used to determine values of operational parameters of the pump motor such as motor speed, current drawn, power output, etc. using sensors coupled to and/or included in the motor controller.

The flow status sensor 140 can output a flow status value. The flow status value can be a flow rate, a motor speed, a current value, an electrical power value, a mechanical power value, a Boolean value indicating whether flow is occurring and/or if the pump is running (e.g., true) or no flow is occurring and/or of the pump is not running (e.g., false), or another value related to flow of the fluid 115 and/or the pump 111 and/or pump motor. In some embodiments, the flow status sensor 140 can include one or more temperature sensors coupled to the piping system 110, and more specifically piping or tanks such as piping 112 included in the piping system 110. The flow of the fluid 115 can be determined based on a change in temperature over a discrete time period at a specific temperature sensor 130 or by determining the difference in temperature between two or more temperature sensors 130. The change and/or difference in temperature can correspond to how the fluid 115 is moving in the piping 112. In embodiments that use one or more temperature sensors to detect flow of the fluid 115, the flow status value can be a raw temperature value, a difference in temperature between two temperature sensors 130, a change in a temperature value (i.e., a change in temperature over a discrete time period), etc.

In some embodiments, the controller 152 of the EHT management system 150 can be included in a process automation system including at least one processor and at least one memory. In other embodiments, the controller 152 can be a standalone controller such as a microcontroller that can include at least one processor and at least one memory or a programmable logic controller (PLC). The controller 152 can be configured to execute an EHT management program. The controller 152 can be any controller suitable for receiving inputs from one or more sensors, devices, or sources of data representing temperature and/or flow. The controller 152 can be coupled to the temperature sensor 130 in order to receive the temperature value. The controller 152 can be coupled to the flow status sensor 140 in order to receive the flow status value. The controller 152 can be coupled to the EHT heating element 120 in order to selectively energize the EHT circuit 120 in order to heat the piping system 110. The controller 120 can selectively energize the EHT heating element 120 based on the temperature value and/or the flow status value.

In some embodiments, the EHT management system 150 and/or the controller 152 can be coupled to a weather monitoring service 180 in order to receive weather information, such as weather forecasts, as well as raw data such as temperatures, atmospheric pressures, humidity, precipitation, wind speeds etc. associated with the geographical area of the piping system 110. The EHT management system 150 can be coupled to the weather monitoring service 180 via an internet connection or other data connection. The weather monitoring service 180 can be an external service such as AccuWeatherTM. The EHT management system 150 can determine a cool down period based on the weather information.

Figure 4:
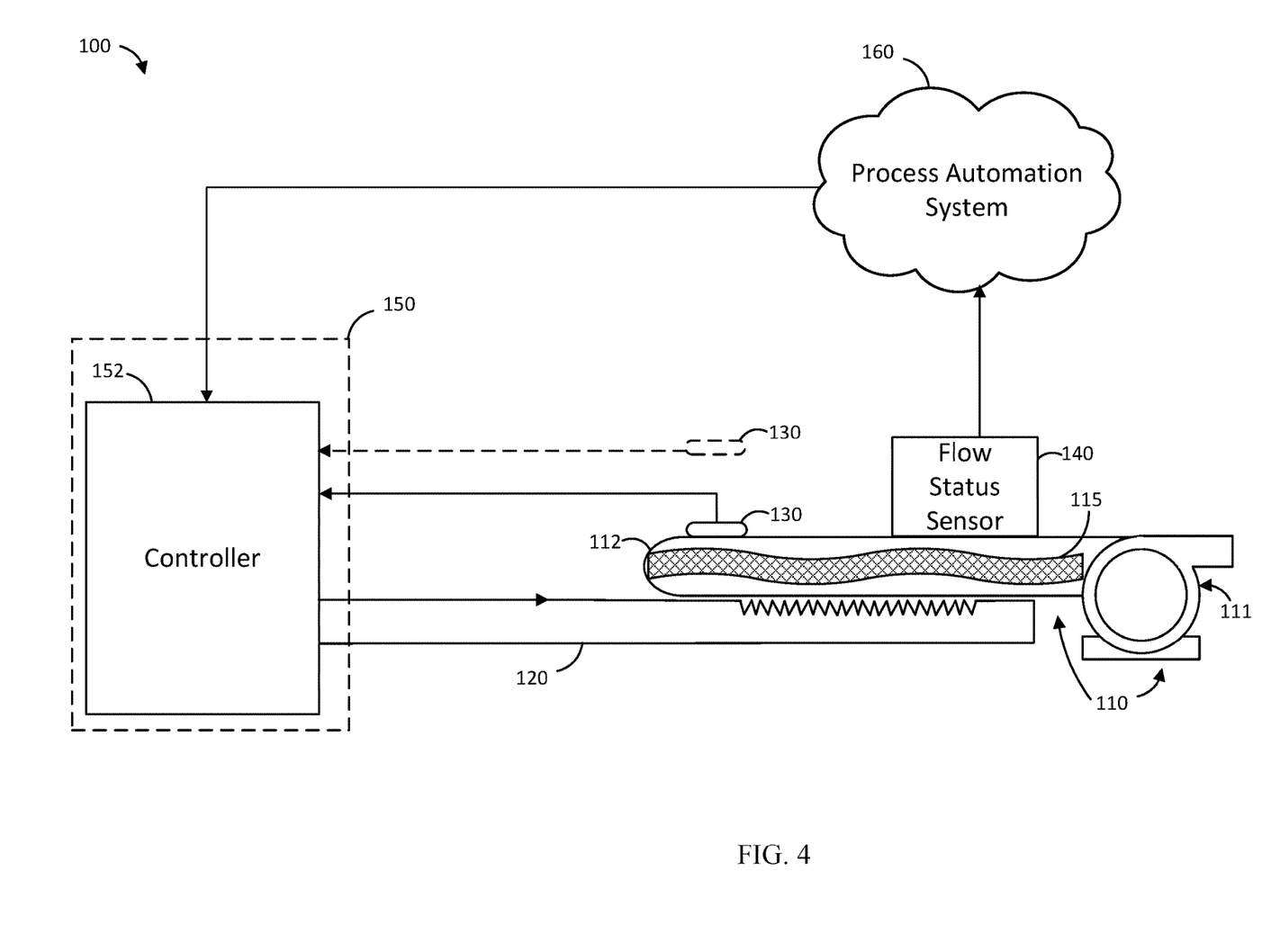
FIG. 4 is a schematic diagram of an EHT control system according to another embodiment of the invention.

FIG. 4 illustrates another embodiment of the EHT control system 100 including a process automation system 160. The process automation system 160 can be directly, indirectly, or wirelessly connected to one or more sensors including the temperature sensor 130 and/or the flow status sensor 140. The sensors 130, 140 can output values to the process automation system 160 including the temperature value or the flow status value. The process automation system 160 can be coupled to the controller 152. Any values the process automation system 160 receives can be sent to or read by the controller 152.

Figure 5:
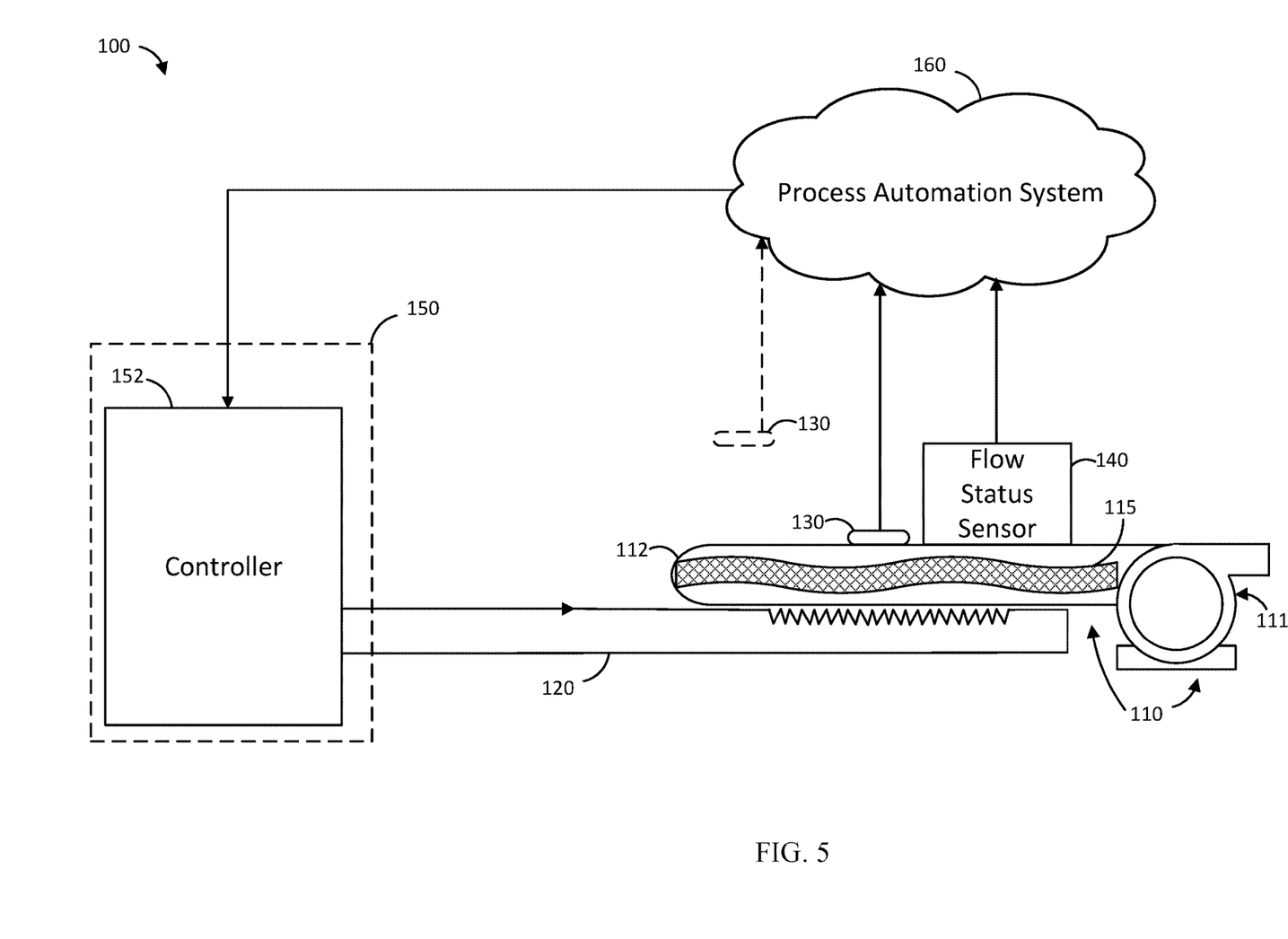
FIG. 5 is a schematic diagram of an EHT control system according to another embodiment of the invention.

FIG. 5 illustrates another embodiment of the EHT control system 100. The process automation system 160 can be directly, indirectly, or wirelessly connected to the temperature sensor 130 as well as the flow status sensor 140. The temperature sensor 130 and/or the flow status sensor 140 can output values to the process automation system 160 including the temperature value or the flow status value. The process automation system 160 can be coupled to the controller 152. Any values the process automation system 160 receives can be sent to or read by the controller 152.

Figure 6:
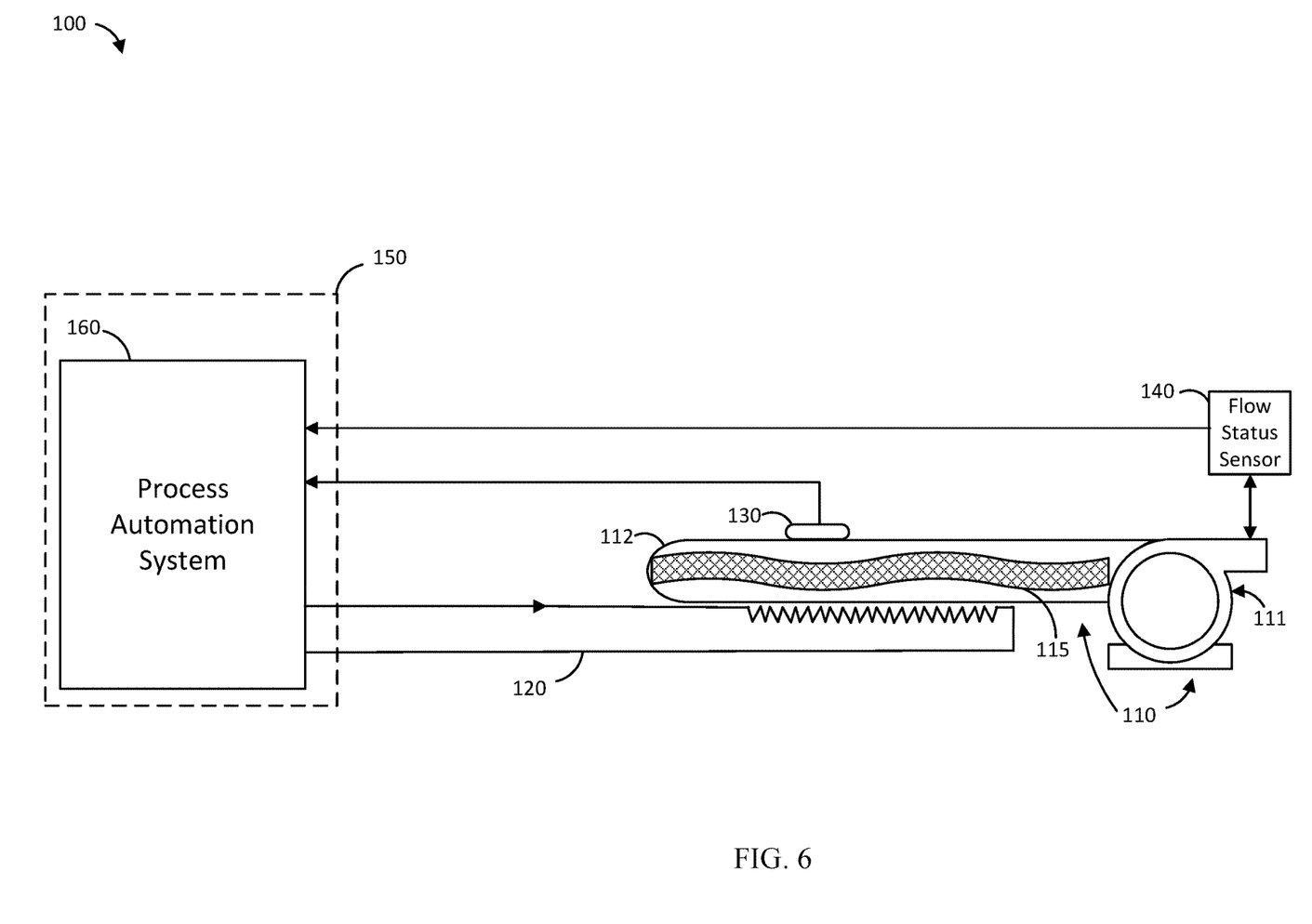
FIG. 6 is a schematic diagram of an EHT control system according to another embodiment of the invention.

FIG. 6 illustrates yet another embodiment of the EHT control system 100. The process automation system 160 can be directly, indirectly, or wirelessly connected to the temperature sensor 130 and the flow status sensor 140, as well as the EHT heating element 120. The process automation system 160 can be included within the EHT management system 150. The temperature sensor 130 and/or the flow status sensor 140 can output values to the process automation system 160 including the temperature value or the flow status value. The flow status sensor 140 can be coupled to the pump 111 and configured to output one or more flow status values including one or more values of parameters related to the operation of the pump 111. The flow status sensor 140 can be a current meter, speed gauge, motor controller, or any other device that can measure values of one or more parameters related to the operation of the pump 111 and/or pump motor. The flow status sensor 140 can be a sensor that receives a signal indicating whether the pump 111 and/or pump motor is on or off. The flow status sensor 140 can be a motor controller coupled to the pump motor and configured to output values of operational parameters of the pump motor, such a flow status value such as a flow rate, a motor speed, a current value, an electrical power value, a mechanical power value, a Boolean value indicating whether flow is occurring and/or if the pump is running (e.g., true) or no flow is occurring and/or of the pump is not running (e.g., false), or other values related to flow of the fluid 115 and/or the pump 111 and/or pump motor. The process automation system 160 can selectively power the EHT heating element 120 based on the temperature value and the flow status value.

Figure 7:
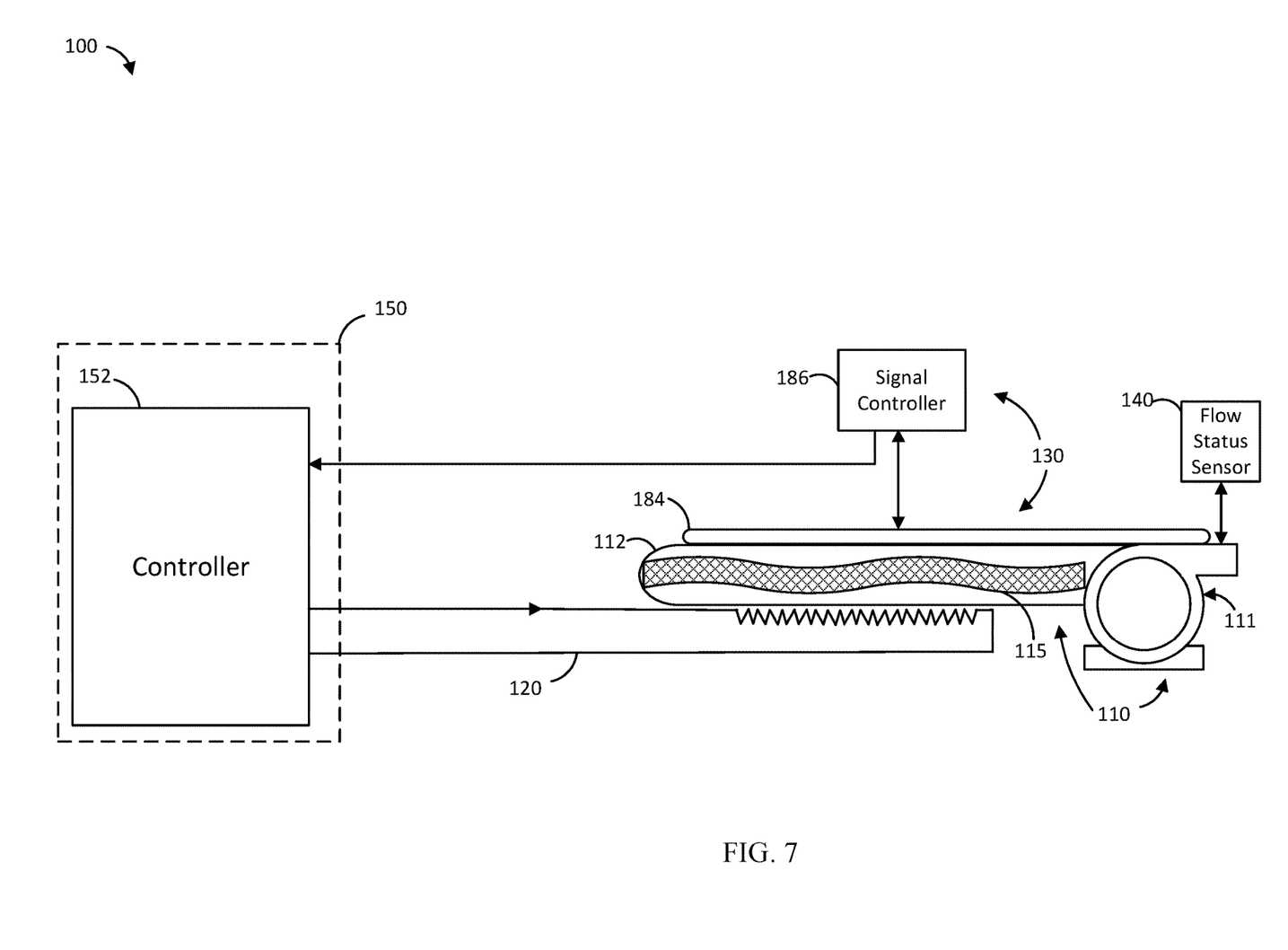
FIG. 7 is a schematic diagram of an EHT control system according to another embodiment of the invention.

FIG. 7 illustrates an additional embodiment of the EHT control system 100 including a linear temperature sensor. The temperature sensor 130 can be a linear temperature sensor, such as a distributed temperature sensing (DTS) system including an optical fiber 184 configured to sense temperature at multiple data points along the length of the optical fiber 184. The optical fiber 184 can be arranged throughout the piping system 110. More specifically, the optical fiber can be arranged on the outer surface of the pipes 112. In some embodiments, the optical fiber can be arranged inside the pipes 112. In some embodiments, the temperature sensor 130 may include a standalone signal controller 186 configured to provide a laser source to the optical fiber 184 and to process signals from the optical fiber 184 in order to determine a plurality of temperature values at various locations along the optical fiber 184 and output the temperature values to the EHT management system 150 an/or the controller 152. In other embodiments, the controller 152 can provide the functionality of the signal controller 186. Multiple optical fibers can be used in the EHT control system 100.

The elements shown and described with respect to FIGS. 1-7 can be combined and/or rearranged. For example, any of the sensors (e.g., temperature sensors 130, 130A-E and/or the flow status sensor 140) can be coupled to the controller 152 directly using a wired or wireless connection or indirectly coupled to the controller 152 via the process automation system 160. Various flow status sensor types, such as types coupled to the pump 110 or coupled to one of the pipes 112, can be interchanged. Various temperature sensor types, including linear sensors such as DTS systems including at least one optical fiber 184 and at least one signal controller 186 and/or resistance thermometers, resistance temperature detectors, or other applicable sensors capable of detecting a temperature, can be used in place of and/or in combination with each other.

Figure 8:
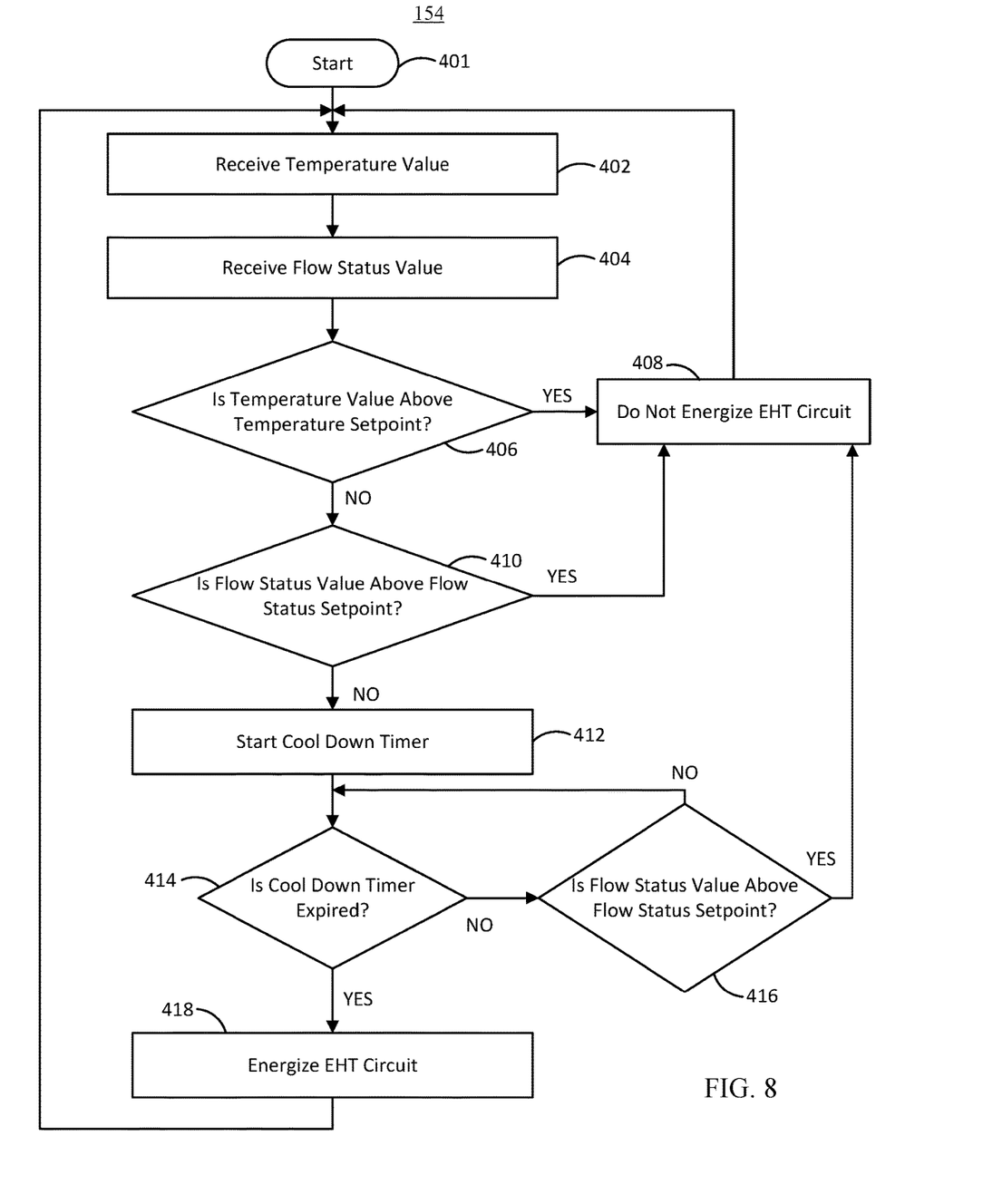
FIG. 8 is a flow chart of an EHT management system according to one embodiment of the invention.

FIG. 8 illustrates a method for an EHT management system 154 according to some embodiments of the invention. The EHT management system 154 can be the EHT management system 150 described above. This embodiment can be used in a freeze protection application. FIG. 8 shows a process including steps 402-418 that can be stored as computer readable instructions on a memory of a computational device, such as the controller 152 or the process automation system 160. Steps 402-418 can be included in an EHT management program as computer readable instructions. The EHT management program can be executed by the controller 152 and/or the process automation system 160.

At 401, the fluid 115 may be flowing and/or above a freezing temperature of the fluid 115. At 402, the EHT management system 154 can receive the temperature value. The temperature value can be received from the temperature sensor 130 and/or the process automation system 160, and may be a temperature of a pipe included in the piping system 110 or an ambient temperature sensed near the piping system 110. In embodiments where the temperature sensor is a DTS system, the EHT management system 154 can receive multiple temperatures values. In some embodiments, at 402, the EHT management system 154 can receive at least two temperature values from multiple sensors such as at least two of temperature sensors 130A-E. In some embodiments, the EHT management system 154 can continuously receive one or more temperature values.

At 404, the EHT management system 154 can receive the flow status value. The flow status value can be received from the flow status sensor 140 and/or the process automation system 160. The flow status value can be a flow rate, a motor speed, a current value, an electrical power value, a mechanical power value, or another value related to a flow of the fluid 115, the pump 111, and/or the pump motor. In some embodiments, the EHT management system 154 can continuously receive flow status values from the flow status sensor 140 and/or the process automation system 160.

At 406, the EHT management system 154 can determine if the temperature value is above a temperature setpoint. The temperature setpoint can be a predetermined value related to freezing or viscosity control of the fluid 115, such as a temperature that will maintain a target viscosity level of the fluid 115. In embodiments where the EHT management system 154 receives multiple temperature values (e.g., embodiments that use a DTS system as a temperature sensor or receive at least two temperature values from at least two temperature sensors), the EHT management system 154 can determine if all of the temperature values are above the temperature setpoint. If the EHT management system 154 determines that the temperature value is above the temperature setpoint or that all of the temperature values are above the temperature setpoint (i.e., the "YES" at 406), the EHT management system 154 can proceed to 408. If the EHT management system 154 determines that the temperature value is not above the temperature setpoint or that not all of the temperature values are above the temperature setpoint (i.e., the "NO" at 406), the EHT management system 154 can proceed to 410.

At 408, the EHT management system 154 can continue to not energize or cease to energize the EHT circuit 120. The EHT circuit 120 may not need to be energized because the fluid 115 is already flowing and/or because the temperature value is above the temperature setpoint. In either case, the fluid 115 may not be at risk of freezing, and the EHT circuit 120 need not be energized.

At 410, the EHT management system 154 can determine if the flow status value is above a flow status setpoint. The flow status setpoint can be a value that can indicate flow of the fluid 115. For example, if the flow status value is a flow value output from a flow meter, the EHT management system 154 can determine if the flow value is high enough to indicate flow of the fluid, such as if the flow status value is above approximately zero volumetric units per time period. In another example, if the flow status value is related to the operation of the pump 111 and/or pump motor, the EHT management system 154 can determine if the pump 111 is operating in a state that can indicate flow of the fluid 115. In this example, if the flow status value is a current value of the pump motor, the EHT management system 154 can determine if the pump motor is drawing enough current to make the fluid 115 flow.

If the EHT management system 154 determines that the flow status value is above the flow status setpoint (i.e., the "YES" at 410), the EHT management system 154 can proceed to 408. If the EHT management system 154 determines that the flow status value is not above the flow status setpoint (i.e., the "NO" at 410), the EHT management system 154 can proceed to 412.

At 412, the EHT management system 154 can start a cool down timer. The cool down timer can wait a cool down period until the cool down timer is expired. The cool down period can be a predetermined value. In some embodiments, the cool down period can be determined at 412 in order to use current value representing how long the fluid 115 will take to reach the critical predetermined value. The cool down period can correspond to a length of time that it can take the temperature of the fluid 115 to reach approximately the freezing temperature of the fluid (e.g., within about one degree Celsius in some embodiments). The fluid temperature may be higher than the temperature value, because temperature value is based on a temperature of one or more pipes 112. The pipes 112 can have lower temperature than the fluid 115 due to heat loss. The cool down period can be determined at least in part due to heat loss characteristics and other thermodynamic properties of the pipes 112, the high heat loss points such as valves, flanges, pipe anchors, and/or pipe guides, and the fluid 115 in the pipes 112, or by the difference between the setpoint and the temperature of the pipes 112 and/or the ambient temperature when flow of the fluid 115 is stopped. In some embodiments, the cool down period can be determined at 412 in order to use a current value representing how long it may take for the temperature of the fluid 115 to reach the critical pre-determined value.

In some embodiments, the cool down period can be determined based on one or more of the temperature values received by the EHT management system 154, at least a portion of the weather information received by the EHT management system, and/or heat loss characteristics and other thermodynamic properties of the pipes 112, the heat loss points such as valves, flanges, pipe anchors, and/or pipe guides, and the fluid 115 in the pipes 112. The EHT management system 154 can determine the difference between the setpoint and the lowest of any temperatures received and determine that the cool down period is equal to how long it will take for the fluid 115 to drop to the critical temperature based on the difference.

The EHT management system 154 may also determine the cool down period based on the weather information. The EHT management system 154 can use a recent history of weather conditions including ambient temperatures and/or wind speeds to determine the cool down period. For example, if the EHT management system 154 determines that ambient temperatures have been trending downwards (i.e., getting colder) and/or that wind speeds are trending upwards, the EHT management system 154 may shorten the cool down period. Higher wind speeds may increase heat loss throughout the piping system 110. Alternatively, if the EHT management system 154 determines that ambient temperatures have been trending upwards (i.e., getting hotter) and/or that wind speeds are trending downwards, the EHT management system 154 may lengthen the cool down period.

The EHT management system 154 can also use future predicted weather conditions to determine the cool down period. More specifically, the EHT management system 154 can determine the cool down period based on weather forecast data including predicted future ambient temperatures and/or wind speeds in the geographical area of the piping system 110. For example, if the weather forecast data includes predicted ambient temperatures that are trending downwards and/or wind speeds that are trending upwards, the EHT management system 154 may shorten the cool down period. Alternatively, if the weather forecast data includes predicted ambient temperatures that are trending upwards and/or wind speeds that are trending downwards, the EHT management system 154 may lengthen the cool down period. Helping to ensure that the cool down period is accurate can allow the EHT management system 154 to only activate the EHT circuit 120 when necessary, causing the EHT control system 100 to run more efficiently and possibly save energy.

At 414, the EHT management system 154 can determine if the cool down timer is expired. In some embodiments, at 414, the EHT management system 154 can periodically (e.g., every half hour in some embodiments) update the cool down timer by determining the cool down period based on the most recent temperature value(s) and/or weather information received. The cool down period can be determined using any of the techniques described above in conjunction with step 412. If the EHT management system 154 determines that the cool down timer is expired (i.e., the "YES" at 414), the EHT management system 154 can proceed to 418. If the EHT management system 154 determines that the cool down timer is not expired (i.e., the "NO" at 414), the EHT management system 154 can proceed to 416.

At 416, the EHT management system 154 can determine if the flow status value is above a flow status setpoint using methods similar to 410. In some embodiments, the flow status value can be the most recent flow status value received by the EHT management system 154. If the EHT management system 154 determines that the flow status value is above the flow status setpoint (i.e., the "YES" at 416), the EHT management system 154 can proceed to 408. If the EHT management system 154 determines that the flow status value is not above the flow status setpoint (i.e, the "NO" at 416), the EHT management system 154 can proceed to 418.

At 418, the EHT management system 154 can continue to energize or begin energizing the EHT circuit 120. The EHT circuit 120 may need to be energized because the cool down timer has expired and the fluid 115 can be at risk of freezing. The EHT management process 154 can then proceed back to 402.

Figure 9:
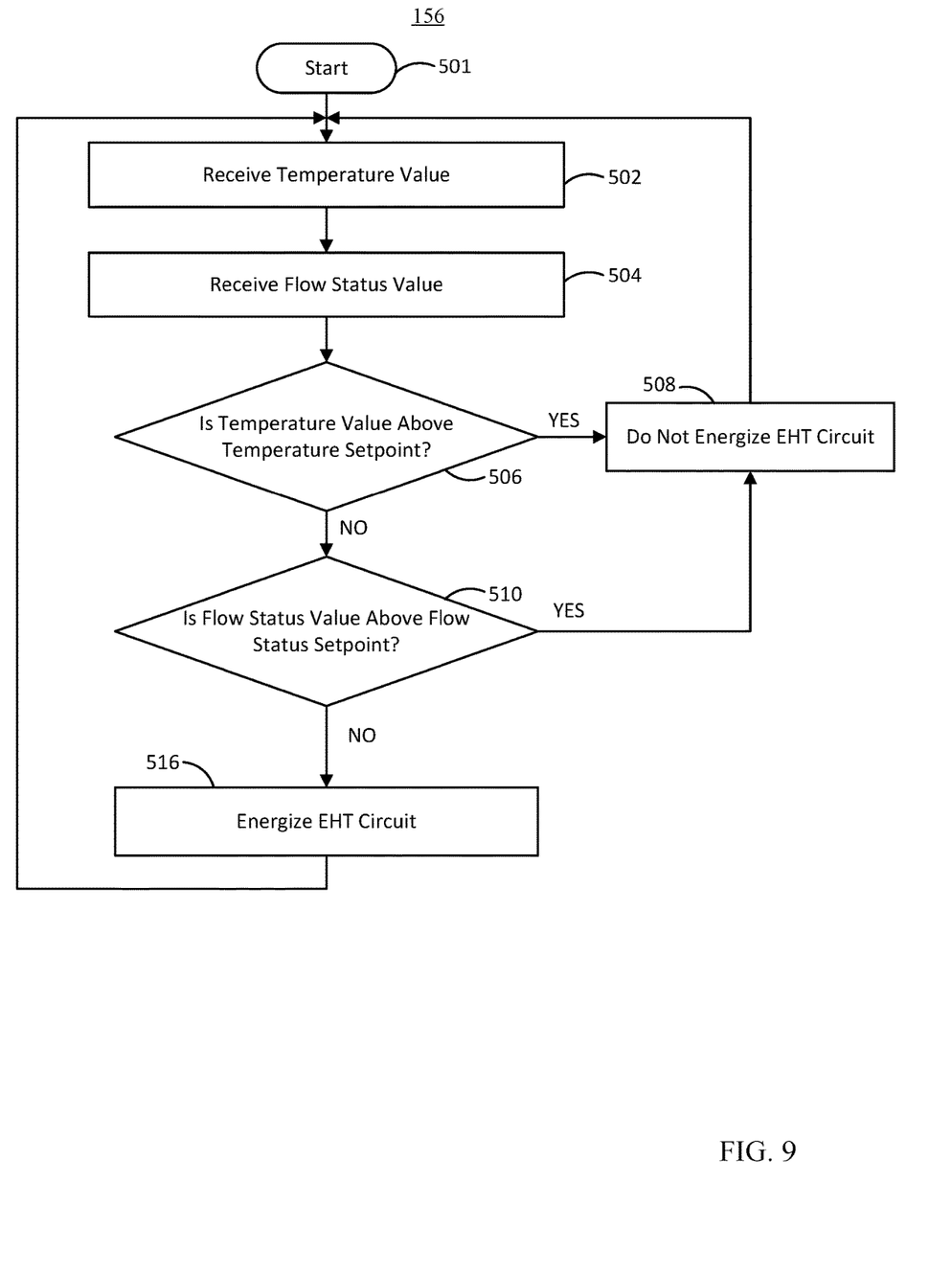
FIG. 9 is a flow chart of an EHT management system according to another embodiment of the invention.

FIG. 9 illustrates a method for an EHT management system 156 is shown in accordance according to another embodiment of the invention. This embodiment can be used for applications such as process maintenance or critical temperature maintenance applications that may require a fluid to be at or above the set point temperature. The EHT management system 156 can be the EHT management system 150 described above. FIG. 9 shows a process including steps 502-516 that can be stored as computer readable instructions on a memory of a computational device such as the controller 152 or the process automation system 160. Steps 502-516 can be included in an EHT management program as computer readable instructions, the EHT management program being executable by the controller 152 and/or the process automation system 160.

At 501, the fluid 115 may be flowing and/or above a freezing temperature of the fluid 115. At 502, the EHT management system 156 can receive the temperature value. The temperature value can be received from the temperature sensor 130 and/or the process automation system 160, and may be a temperature of a pipe included in the piping system 110 or an ambient temperature sensed near the piping system 110. In embodiments where the temperature sensor is a DTS system, the EHT management system 154 can receive multiple temperature values. In some embodiments, at 502, the EHT management system 156 can receive at least two temperature values from multiple sensors such as at least two of temperature sensors 130A-E. In some embodiments, the EHT management system 156 can continuously receive one or more temperature values.

At 504, the EHT management system 156 can receive the flow status value. The flow status value can be received from the flow status sensor 140 and/or the process automation system 160. The flow status value can be a flow rate, a motor speed, a current value, an electrical power value, a mechanical power value, or another value related to a flow of the fluid 115, the pump 111, and/or the pump motor. In some embodiments, the EHT management system 156 can continuously receive flow status values from the flow status sensor 140 and/or the process automation system 160.

At 506, the EHT management system 156 can determine if the temperature value is above a temperature setpoint. The temperature setpoint can be a predetermined value related to freezing or viscosity control of the fluid 115, such as a temperature that will maintain a target viscosity level of the fluid 115. In embodiments where the EHT management system 156 received multiple temperature values (e.g., embodiments that use a DTS system as a temperature sensor or receive at least two temperature values from at least two temperature sensors), the EHT management system 154 can determine if all of the temperature values are above the temperature setpoint. If the EHT management system 156 determines that the temperature value is above the temperature setpoint (i.e., the "YES" at 506), the EHT management system 156 can proceed to 508. If the EHT management system 156 determines that the temperature value is not above the temperature setpoint (i.e., the "NO" at 506), the EHT management system 156 can proceed to 510.

At 508, the EHT management system 156 can continue to not energize or cease energizing the EHT circuit 120. The EHT circuit 120 may not need to be energized because the fluid 115 is already flowing and/or because the temperature value is above the temperature setpoint. In either case, the fluid 115 may not be at risk of freezing, and the EHT circuit 120 need not be energized.

At 510, the EHT management system 156 can determine if the flow status value is above a flow status setpoint. The flow status setpoint can be a predetermined value that can indicate flow of the fluid 115. For example, if the flow status value is a flow value output from a flow meter, the EHT management system 156 can determine if the flow value is high enough to indicate flow of the fluid, such as if the flow status value is above approximately zero volumetric units per time period. In another example, if the flow status value is related to the operation of the pump 111 and/or pump motor, the EHT management system 156 can determine if the pump 111 is operating in a state that can indicate flow of the fluid 115. In this example, if the flow status value is a current value of the pump motor, the EHT management system 156 can determine if the pump motor is drawing enough current make the fluid 115 flow.

If the EHT management system 156 determines that the flow status value is above the flow status setpoint (i.e., the "YES" at 510), the EHT management system 156 can proceed to 508. If the EHT management system 156 determines that the flow status value is not above the flow status setpoint (i.e, the "NO" at 510), the EHT management system 156 can proceed to 516.

At 516, the EHT management system 156 can continue to energize or begin energizing the EHT circuit 120. The EHT circuit 120 may need to be energized in order to heat the pipes 112 and/or fluid 115 above the temperature setpoint and/or prevent the fluid 115 from freezing. The EHT management process 156 can then proceed back to 502.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, any of the features or functions of any of the embodiments disclosed herein may be incorporated into any of the other embodiments disclosed herein. Various features and advantages of the invention are set forth in the following claims.

The invention claimed is:

1. An electric heat trace control system for use with a piping system comprising at least one pipe and capable of transporting a fluid; the electric heat trace control system comprising:
an electric heat trace (EHT) circuit for heating at least a portion of the piping system;
a temperature sensor outputting a temperature value corresponding to the portion of the piping system;
a flow status sensor outputting a flow status value corresponding to the portion of the piping system;
an electric heat trace management system comprising a controller, the controller connected to the EHT circuit in order to selectively energize the EHT circuit; the controller connected to the temperature sensor in order to receive the temperature value; and the controller connected to the flow status sensor in order to receive the flow status value; the controller configured to execute an EHT management program, the EHT management program comprising the steps of:
receiving the temperature value;
receiving the flow status value;
ceasing to energize the EHT circuit when the temperature value is above a predetermined temperature setpoint; and
upon determining that the temperature value is not above the predetermined temperature setpoint, starting a cool down timer configured to wait until a cool down period expires;
determining that the cool down period has expired; and
energizing the EHT circuit in response to determining the cool down period has expired unless, during the cool down period, the flow status value is above a predetermined flow status setpoint indicating flow is occurring through the portion of the piping system.

2. The control system of claim 1, wherein the piping system comprises a pump, the flow status sensor being coupled to the pump, and wherein the flow status value comprises a value of an operational parameter of the pump.

3. The control system of claim 2, wherein the operational parameter of the pump comprises at least one of a motor speed, a current value, or a Boolean value indicating whether or not the pump is running.

4. The control system of claim 1, wherein the EHT management program further comprises receiving a second temperature value from a second sensor, and wherein determining to not energize the EHT circuit comprises:
determining that the temperature value is not above the predetermined temperature setpoint;
determining that the second temperature value is not above the predetermined temperature setpoint; and
determining that the flow status value is above the predetermined flow status setpoint.

5. The control system of claim 1, wherein the flow status sensor is connected to a process automation system, the process automation system being further coupled to the controller.

6. The control system of claim 1, wherein the EHT circuit comprises at least two heat trace cables connected together and configured to be energized or not energized in unison.

7. The control system of claim 1, wherein the temperature value is an ambient air temperature of the piping system.

8. The control system of claim 1, wherein the temperature sensor is coupled to a pipe included in the pipe system and the temperature value is a temperature of the pipe.

9. An electric heat trace control system for use with a fluid transport system, the electric heat trace control system comprising at least one processor and at least one memory, the at least one memory comprising instructions that, when executed by the at least one processor, cause the electric heat trace control system to:
receive a temperature value corresponding to a portion of the fluid transport system;
receive a flow status value corresponding to a portion of the fluid transport system;
determine that the temperature value is not above a predetermined temperature setpoint;
upon determining that the temperature value is not above the predetermined temperature setpoint, determine that the flow status value is not above a predetermined flow status setpoint;
upon determining that the flow status value is not above the predetermined flow status setpoint, start a cool down timer configured to wait a cool down period;
determine that the cool down period has expired; and
energize an electric heat trace circuit in response to determining the cool down period has expired unless, during the cool down period, the flow status value is above the predetermined flow status setpoint indicating flow is occurring through the portion of the fluid transport system.

10. The control system of claim 9, wherein the cool down period is a time that a temperature of the fluid will take to reach a critical predetermined value.

11. The control system of claim 10, wherein the critical predetermined value is about the freezing temperature of the fluid.

12. The control system of claim 9, wherein the cool down period is determined based on the temperature value.

13. The control system of claim 12, wherein the at least one memory further comprises instructions to receive weather information, and wherein the cool down period is determined based on the weather information.

14. The control system of claim 12, wherein the cool down period is determined based on heat loss characteristics of the fluid transport system.

15. A method for controlling an electric heat trace circuit coupled to a fluid transport system and comprising at least one heating cable, the method comprising:
   receiving a temperature value corresponding to a portion of the fluid transport system capable of transporting a fluid;
   receiving a flow status value corresponding to a portion of the fluid transport system;
   determining that the temperature value is not above a predetermined temperature setpoint;
   upon determining that the temperature value is not above the predetermined temperature setpoint, determining that the flow status value is not above a predetermined flow status setpoint;
   upon determining that the flow status value is not above the predetermined flow status setpoint, starting a cool down timer configured to wait a cool down period;
   determining that the cool down period has expired; and
   energizing the electric heat trace circuit in response to determining the cool down timer is expired unless, during the cool down period, the flow status value is above the predetermined flow status setpoint indicating flow is occurring through the portion of the fluid transport system.

16. The method of claim 15, wherein the flow status value is a value of an operational parameter of a pump included in the fluid transport system.

17. The method of claim 15, wherein the temperature value is an ambient temperature of the fluid transport system.

18. The method of claim 15 further comprising:
   determining that the temperature value is not above the predetermined temperature setpoint;
   determining that the flow status value is above the predetermined flow status setpoint; and
   ceasing to energize the electric heat trace circuit in response to determining that the flow status value is above the predetermined flow status setpoint.

19. The method of claim 15, further comprising determining the cool down period as a time that a temperature of the fluid will take to reach a critical predetermined value.

20. The method of claim 15, further comprising:
   receiving weather information; and
   determining the cool down period as a time that a temperature of the fluid will take to reach a critical predetermined value based on the weather information.

* * * * *